United States Patent [19]

Duga

[11] 4,140,468
[45] Feb. 20, 1979

[54] PLASTIC BOTTLE FORMING MACHINE WITH MODULAR DESIGN

[75] Inventor: Robert J. Duga, Enfield, Conn.

[73] Assignee: Emhart Industries, Inc., Farmington, Conn.

[21] Appl. No.: 806,171

[22] Filed: Jun. 13, 1977

[51] Int. Cl.² ............................................. B29D 23/03
[52] U.S. Cl. ..................................................... 425/534
[58] Field of Search ............... 425/532, 533, 534, 522, 425/540; 264/97

[56] References Cited

U.S. PATENT DOCUMENTS

| | | | |
|---|---|---|---|
| 3,480,993 | 12/1969 | Schjeldahl et al. | 425/533 X |
| 3,792,946 | 2/1974 | Zavasnick | 425/534 X |
| 3,850,562 | 11/1974 | Takeachi et al. | 425/534 X |
| 3,887,316 | 6/1975 | Hestehave | 425/534 X |
| 3,941,539 | 3/1976 | Saumsiegle | 425/534 X |

FOREIGN PATENT DOCUMENTS

| | | | |
|---|---|---|---|
| 2113960 | 6/1972 | France | 425/533 |
| 4530592 | 2/1966 | Japan | 425/534 |

Primary Examiner—William R. Briggs
Attorney, Agent, or Firm—A. W. Breiner

[57] ABSTRACT

Machine system for continuous formation of molecularly oriented plastic bottles by blowing heat-conditioned parisons comprising a modular unit including a parison forming section for simultaneously forming a plurality, preferably four, of parisons in injection molds, each mold having a neck ring assembly; a blowing or bottle forming section for simultaneously blowing the same number of bottles in blow molds as there are parisons in the parison forming section, and an invert arm assembly having a plurality of arms constructed and arranged between said parison forming section and bottle forming section so that the extreme end of each invert arm will retain the neck ring assembly of the injection mold, and in a first position the arms and neck rings are in operable association with the parison injection molds and in a second position are in operable association with the blow molds. In the method of operation, the arms of the invert arm assembly retain the neck rings of the parison forming molds, the parisons are simultaneously molded, the invert arm and neck ring assembly inverted, i.e., rotated 180 degrees, depositing the formed parisons and neck rings in operable association with an open blow mold. After blow mold closing, the neck rings are opened and the invert arms carrying the neck rings are again inverted, i.e., rotated 180 degrees in the opposite direction, to the first invert movement, and the cycle begins again. The machine system provides for rapid manufacture of bottles, is compact, and makes efficient use of machine components.

9 Claims, 16 Drawing Figures

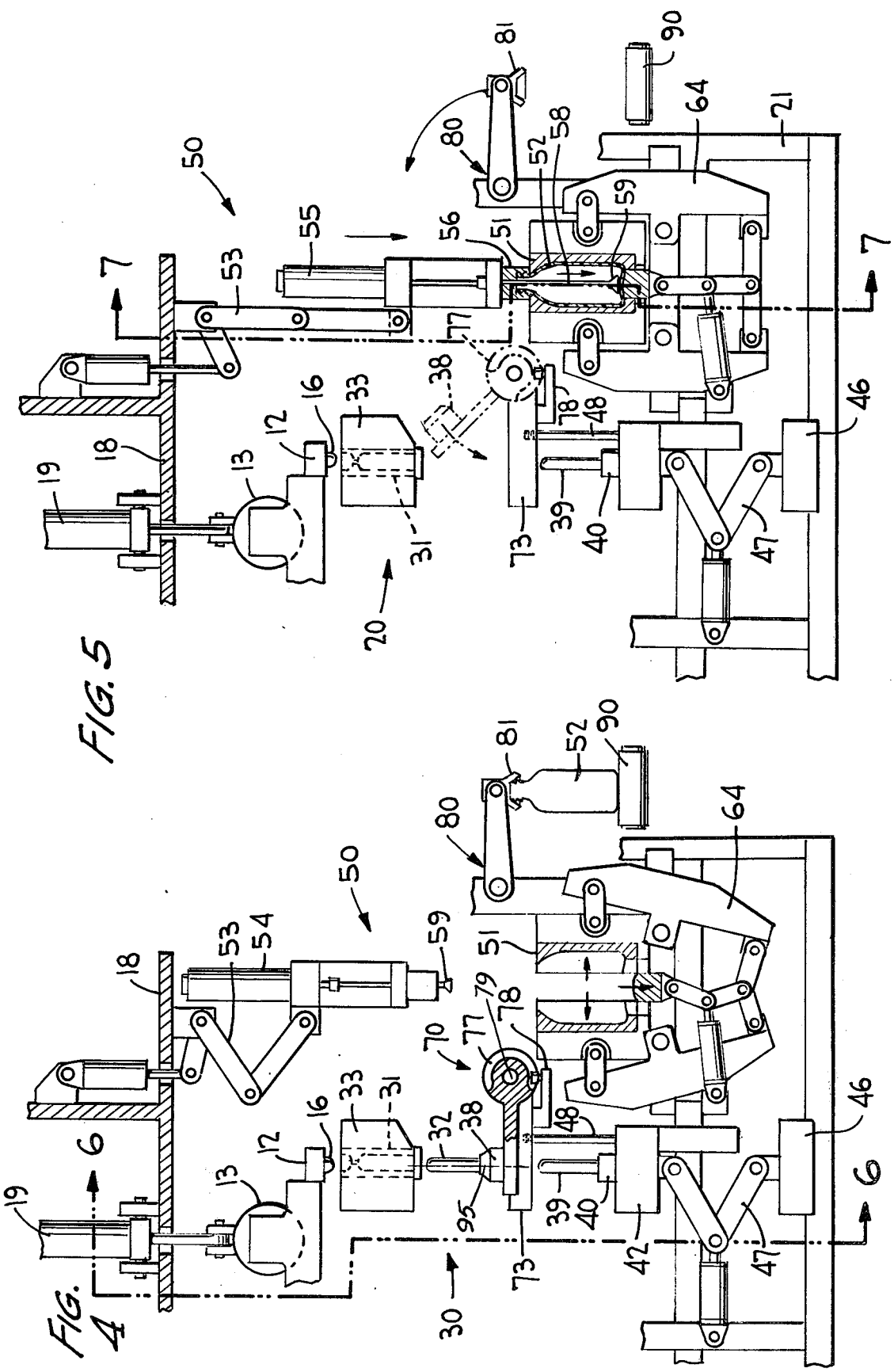

4,140,468

PLASTIC BOTTLE FORMING MACHINE WITH MODULAR DESIGN

FIELD OF INVENTION AND BACKGROUND

This invention is directed to a method and apparatus for molding of plastic bottles. More particularly, it is directed to the hot-blow or one-step process for the manufacture of molecularly oriented plastic bottles which is rapid and which has a high degree of component utilization and overall efficiency.

In recent years, substantial effort has been directed to the formation of plastic bottles as a replacement, or partial replacement of glass bottles. This effort has built on knowledge that plastic such as polyethylene terephthalate (PET) when molecularly stretched is tougher but lighter than glass, and the glass art which describes both methods and apparatus for stretching and blowing glass in both the longitudinal and transverse directions.

According to the prior art, molecularly oriented containers such as plastic bottles have utilized primarily either a reheat or two-stage process and system, or a hot-blow or one-stage process and system. In the reheat or two-stage process and system, parisons are first injection molded in a parison mold, cooled to room temperature, and stored for subsequent stretching and blowing into the finished bottle in a blow mold. At the time of stretching and blowing, the parisons are reheated and brought to the orientation and blowing temperature of the plastic prior to blowing. In the hot-blow or one-stage process and system, the parison is injection molded in a parison mold and substantially immediately after formation is transferred while at orientation and blowing temperature to a blow mold where the parison is stretched and blown into the finished bottle.

Of the above-noted systems, the hot-blow or one-stage process and system is preferred. In the reheat or two-stage process and system, although efficient use can be made of both the parison forming and blowing stations which need not be integral, substantial thermal energy is lost during the total operation in that the parison after formation is cooled down and then reheated at time of blowing. Moreover, there is duplicate handling of the parisons. The hot-blow process and system substantially eliminates heat loss and duplicate handling. However, the hot-blow process and system have conventionally employed as an integrated unit an injection assembly, a parison station, a transfer means, and a stretching and blowing station for producing the finished bottle. Generally, the core pin used in forming the parison is transferred with the parison and, accordingly, must serve, at least in part, a double function. Moreover, since the individual components of the system are constructed and arranged as an integral unit, efficient use of the various system components is not realized, nor are the systems as rapid as desired in commercial manufacture.

OBJECTS OF INVENTION AND GENERAL DESCRIPTION

Accordingly, a primary object of this invention is to provide a hot-blow or one-step system for formation of molecularly oriented plastic bottles having a high degree of component utilization.

It is another object of this invention to provide a hot-blow or one-step system for formation of molecularly oriented plastic bottles wherein the parison forming core pin is withdrawn from the parison before transfer to the blow station.

It is another object of this invention to provide a hot-blow or one-step process for the formation of molecularly oriented plastic bottles having a high degree of efficiency.

It is another object of this invention to provide an automatic system and process for the manufacture of molecularly oriented plastic bottles which permits the rapid manufacture of plastic bottles with efficient utilization of thermal energy and machine system components.

It is another object of this invention to provide a machine system including a modular unit for producing N bottles per cycle, wherein N is preferably four or five.

It is another object of this invention to provide a machine system including a modular design wherein modular units for producing N bottles per cycle are placed end to end attached to a common main frame.

It is another object of this invention to provide a machine system including a modular design wherein modular units for producing N bottles per cycle are placed side by side so that the parison forming stations are back to back attached to a common main frame.

It is another object of this invention to provide a machine system including a modular design wherein the modules are constructed so that N blowing stations are serviced with two N parison forming stations.

These and other objects of the present invention will be apparent from the following description, particular reference being made to the drawing.

Briefly, the aforesaid and other objects of the invention are accomplished by constructing a machine system whereby a parison is in a parison or injection mold, the parison inverted by rotation of the parison 180 degrees to position the parison in a blow mold for blowing, and the parison blown. The parison mold of the machine system includes a neck ring and core rod. The neck ring is retained by an invert arm of an invert assembly. After the parison is injection molded about the core rod and the core rod withdrawn, the invert arm and neck ring are inverted, i.e., rotated 180 degrees, into a blow mold with one simple and continuous movement.

The machine system is particularly suited for modular construction whereby a plurality (N) of parisons are simultaneously formed. After formation, the plurality of parisons are simultaneously transferred to a plurality (N) of blow molds through an invert arm and neck ring assembly and simultaneously blown. Although each module can include any reasonable number of parisons for simultaneous formation and blowing into bottles, the system is particularly suited for four or five parisons in each module. This permits utilization of closely spaced parison molds to conform to the relatively small size of the parison, and more widely spaced blow molds to accommodate for the size of the blown bottle through the expediency of providing an invert arm assembly which spreads as it inverts. The invert arm assembly conveniently comprises a splined shaft, a camming roller assembly, and four or five invert arms. If four invert arms are employed, on inversion each of the arms will move to the right or left. By modifying the angular shape of the arms or cam throw, the correct and proper spread is obtained to fit into blow molds of proper size for the desired size of bottle. If five invert arms are employed, the movement will be the same as with four arms with the middle invert arm not translating upon inversion.

The machine system of this invention can comprise a single module, but preferably will include a plurality of modular units. The plurality of modules can be arranged in various configurations. The modules can be arranged end to end on a common frame with a separate injection assembly for each module or a single injection assembly successively servicing each of the modules of the unit, or the modules can be arranged side by side in order that the parison forming sections are back to back whereby two sets of parison molds are simultaneously served by an injection assembly. In this arrangement it can be desirable for increased production to have two parison molds at each parison station and two blow molds at each blow station, one invert arm of the assembly servicing said two parison molds and said two blow molds. This can be accomplished by placing the two parison molds back to back and the two blow molds back to back, and having two neck ring assemblies on the end of the invert arm. Preferably in order to be able to position the parison molds close together and not having the invert arm of an undesirable length requiring substantial headspace on inversion, the invert arms, after the parisons clear the injection or parison molds, preferably having rotated past center (90 degrees), will be actuated at a predetermined point on the invert stroke and automatically extend outwardly with a scissoring or other type of movement. On the return from the blow mold to the parison mold, the invert arms will retract at a predetermined point to fit into the parison molds. As another embodiment one blow mold section is centered between two parison sections. According to the latter arrangement, a first set of parisons are injection molded and temperature conditioned in one of the parison sections by an injection assembly. While a second set of parisons is being injection molded and temperature conditioned, the first set of parisons is inverted into the centrally located blow molds, stretched and blown, the bottles removed, and the invert arm carrying the neck rings inverted for formation of additional parisons. Thereafter, the second set of parisons having been injection molded and temperature conditioned are inverted into the blow mold, stretched and blown, the bottles removed, and the arm carrying the neck rings inverted again for formation of additional parisons with the cycles being continuously repeated. The finished bottles are removed with a shuttle arrangement from the front of the machine system. This embodiment optimizes blow mold utilization in an overall machine system where the blowing cycle is substantially shorter in time, from approximately one-fifth to one-half as long, as the parison forming and temperature conditioning cycle depending on the plastic used. For example, with polyethylene terephthalate the injection molding and conditioning cycle is approximately 20 seconds, whereas the blowing cycle is approximately five seconds.

Although various modifications can be made in the machine system and process of the present invention, for convenience the machine system and process will be described with reference to an apparatus comprising two modules of four units arranged side by side.

DETAILED DESCRIPTION AND DRAWING

In the drawing which illustrates in detail a preferred embodiment and mode of operation, FIG. 1 is a side view, partly broken away and with some detail being omitted, of a two module unit in side by side relation of the machine system of this invention;

FIG. 4 is a sectional view of one side of the machine system of FIG. 3 of the parison forming, blow mold, and take-out area taken along lines 4—4 showing a first movement of the machine system cycle;

FIG. 5 is the same as FIG. 4 however showing a second movement of the machine system cycle;

Figure 10A:
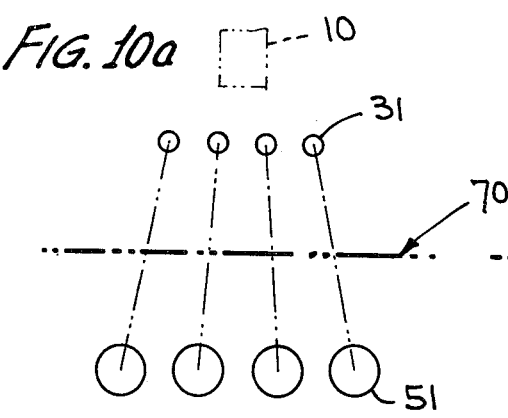
Figure 10B:
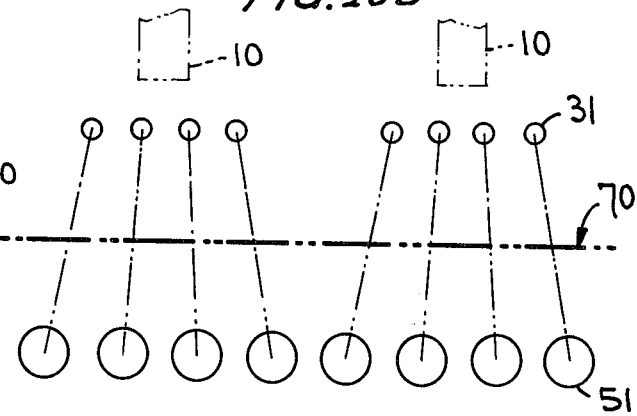
Figure 10C:
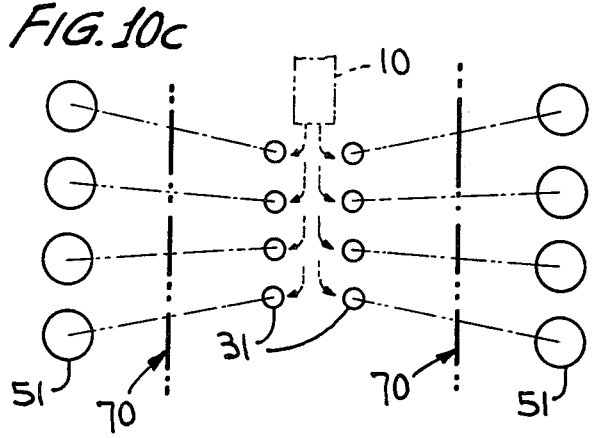
Figure 10D:
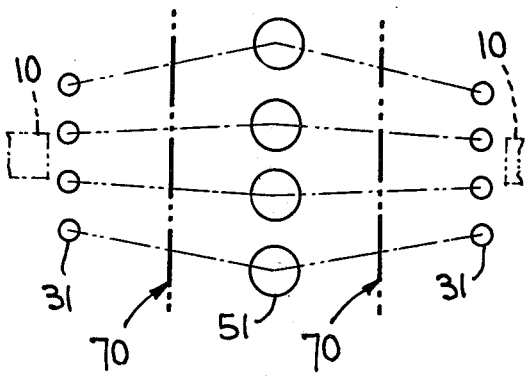
Figure 10E:
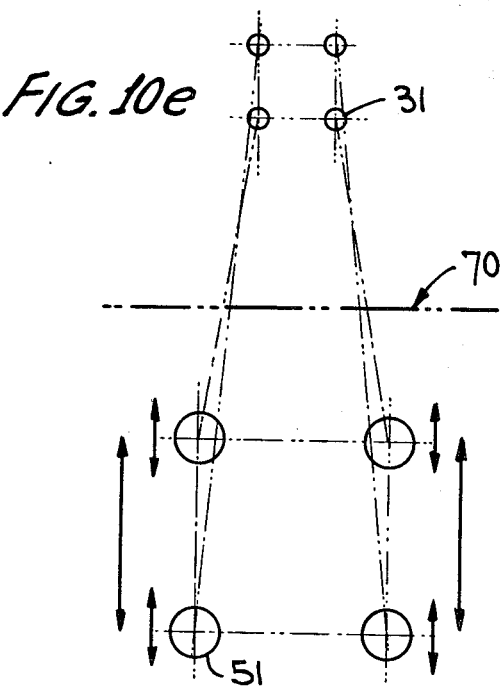
Figure 10F:
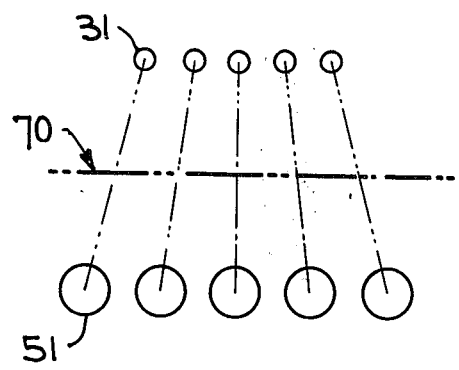
Figure 11:
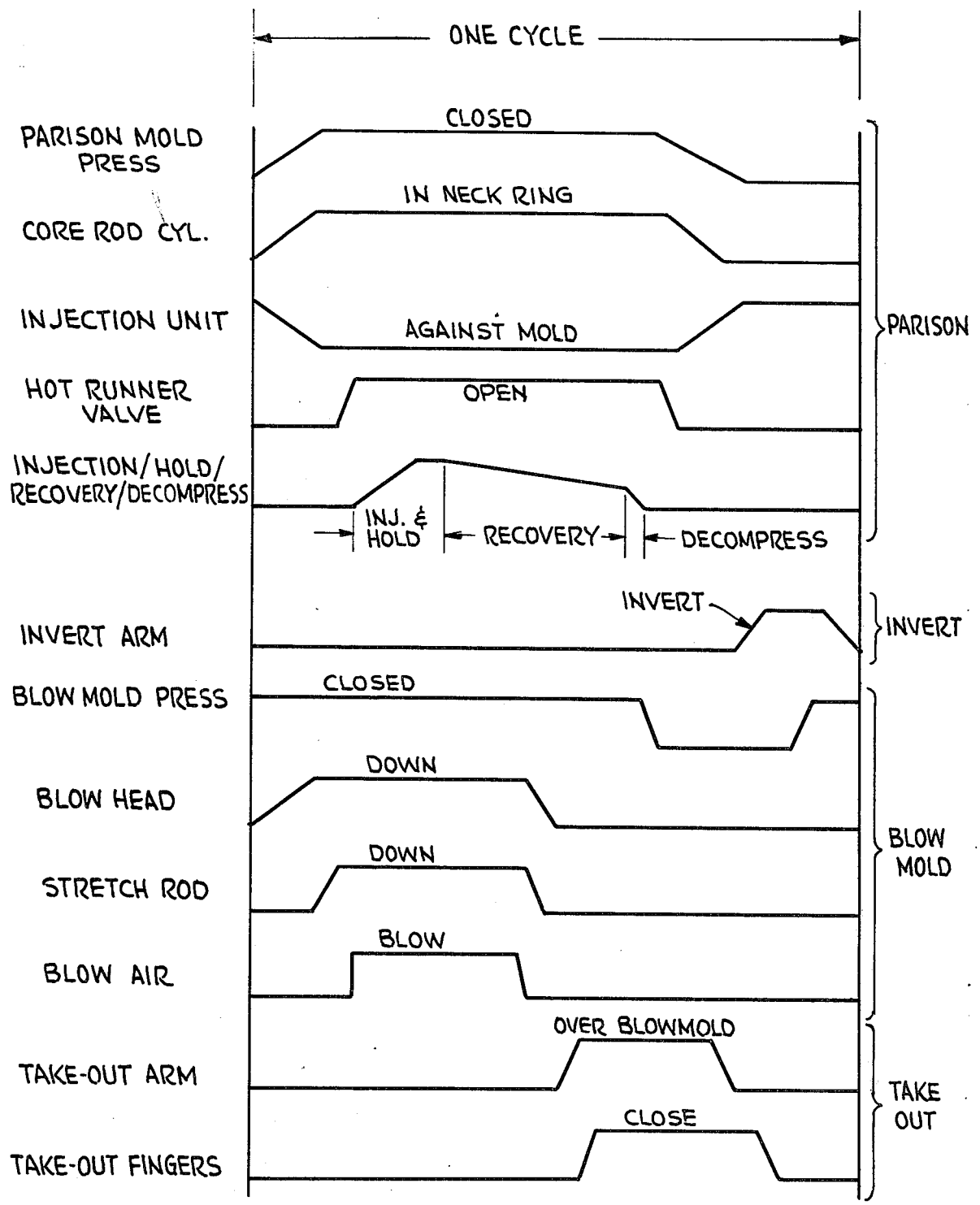

FIGS. 10a-f illustrate diagrammatically various embodiments of the modular units of this invention; and FIG. 11 is a timing diagram of the machine system illustrated in FIGS. 1-9.

Figure 1:
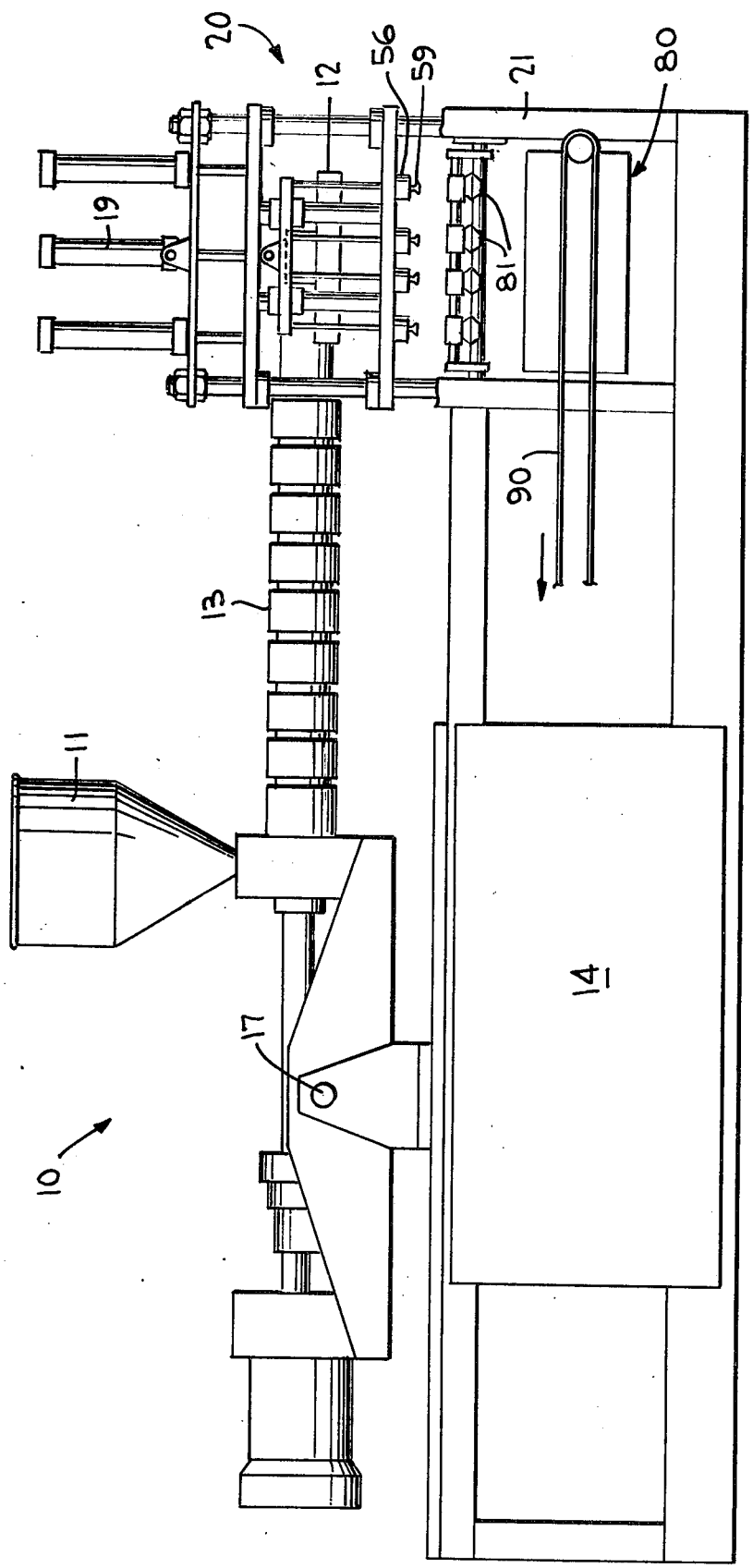
Figure 2:
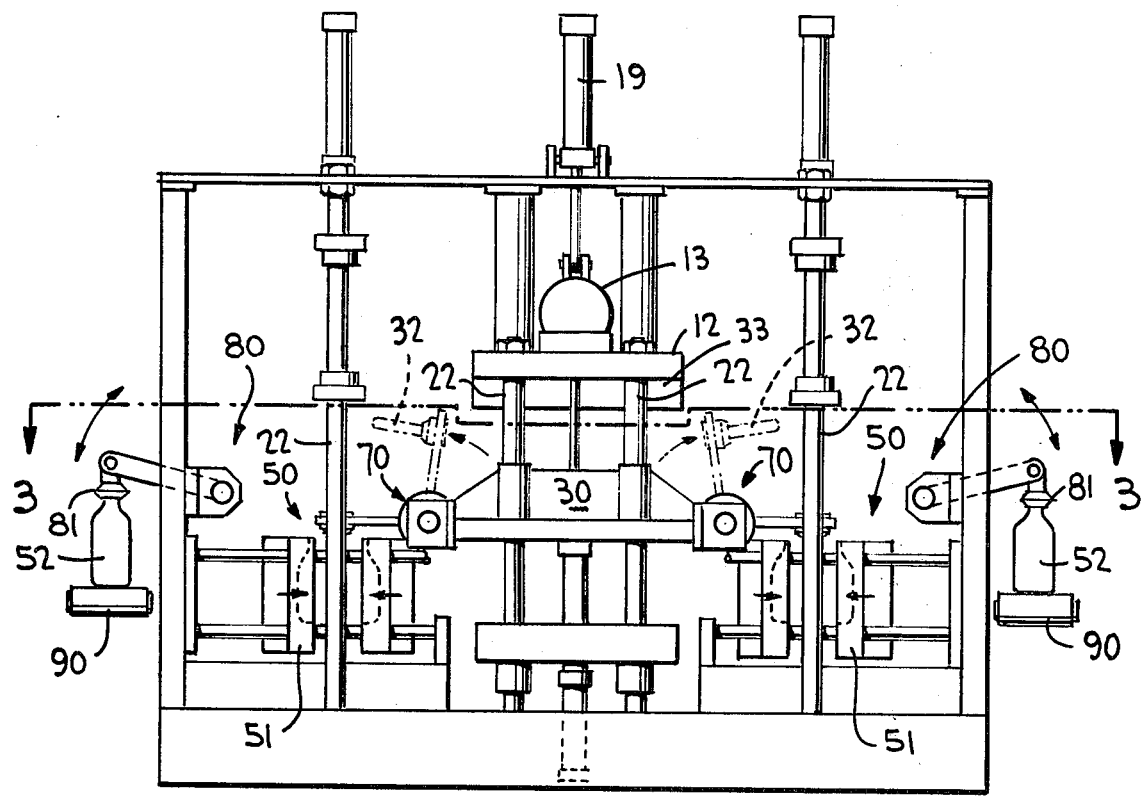
FIG. 2 is a front view, some detail being omitted, of the machine system of FIG. 1.
Figure 3:
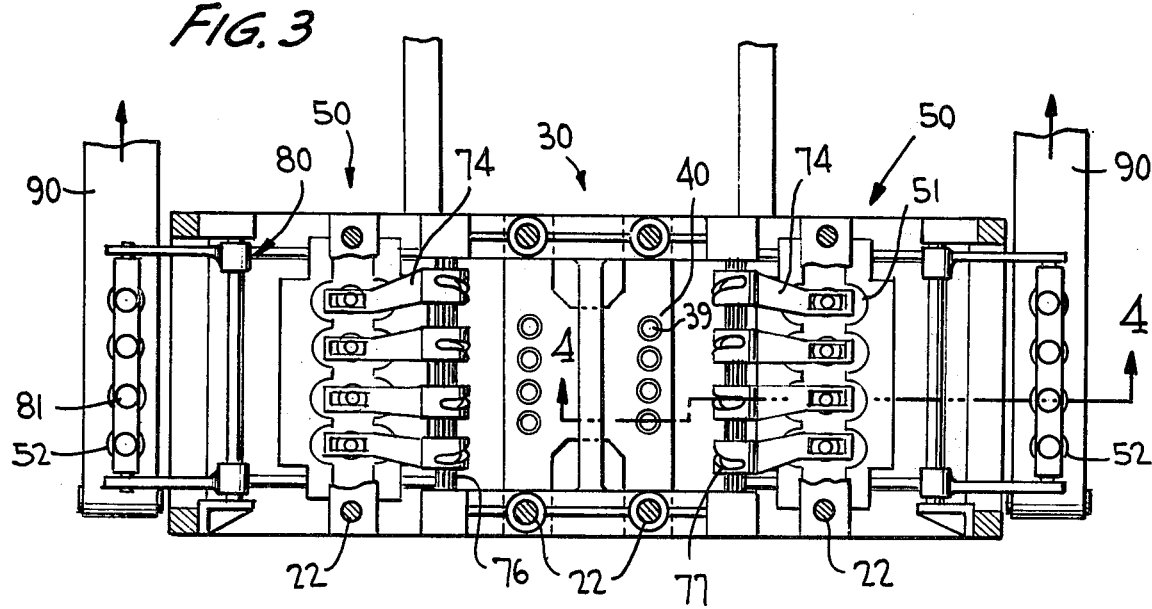
FIG. 3 is a plan view taken on lines 3—3 of FIG. 2 showing the arrangement of the side-by-side parisons, invert arm assemblies, blowing stations, and the bottle removal sections.

General Assembly And Layout (primarily FIGS. 1 and 2)

Referring primarily to FIGS. 1 and 2, the machine system includes as basic sections an injection assembly 10, a parison and bottle forming section 20 including two complete modular units, and bottle take-out unit 80.

Figure 8:
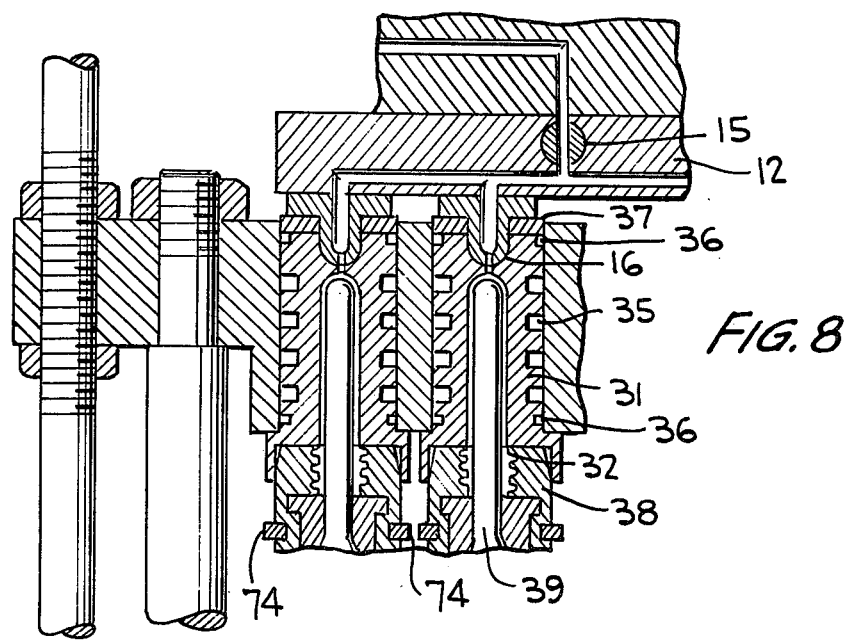
FIG. 8 is a cross-sectional view showing two of the parison molds of the parison forming section with the parison press closed and the injection assembly is in the injecting position.
Figure 9:
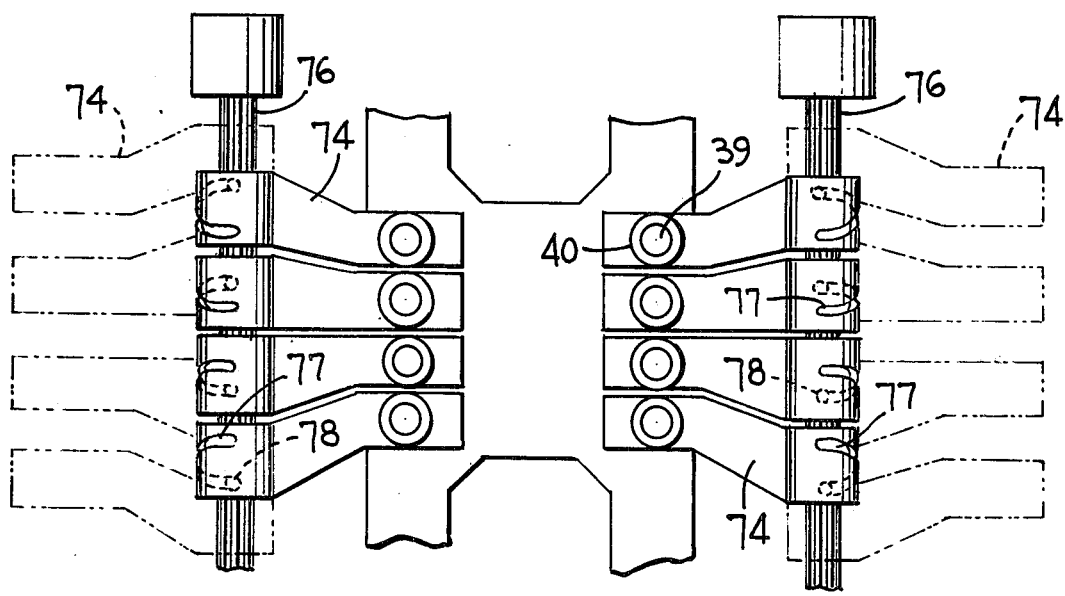
FIG. 9 is an enlarged view showing additional detail with respect to the invert arm spread movement.

Injection Assembly (primarily FIGS. 1 and 8)

The injection assembly 10 includes a feed hopper 11 connected to manifold 12 as shown in FIG. 8 through barrel and screw 13. The injection assembly is mounted on frame 14. Again referring to FIG. 8, manifold 12 is connected to barrel 13 which feeds nozzles 16 which inject hot plastic into the parison molds. Nozzles 16 are moved into and out of injecting position with the parison molds by pivoting the various elements on pivot point 17.

Parison And Bottle Forming Section (primarily FIGS. 2-7)

The parison forming and bottle section 20 comprises a box-shaped weldment 21 which is the primary support and locating member for the parison and bottle forming sections. Attached to frame 21 are eight vertical support bars 22, two of which are the main support for the injection molding or parison forming section 30 and two of which are the main support for the blow molding section 50 of each module unit. Each module of the two modular units of the machine system comprises four parison molds 31, four blow molds 51, and an invert arm assembly 70. Separately supported on box frame 21 is a bottle take-out 80 which picks bottles 52 with jaws 81 and with a rotational movement carries the four bottles 52 simultaneously to the side of frame 21 and drops them on conveyor 90.

Parison Forming Section (primarily FIGS. 4–6 and 8)

The injection assembly pivot actuator 19 is tied in near the top of frame 21 by support 18. Attached to the end of the injection unit barrel 13 is manifold 12 containing the hot runner control valve 15 and four in line nozzles 16 for each module (FIG. 8). A stationary parison mold die plate 33 is attached to the vertical support bars 22 which contains four solid in line parison molds 31. The die plate 33 is the stationary anchor point for the parison mold tie bars 34 and also acts as a liquid coolant manifold for the parison mold 31. The solid parison molds 31 have spiral coolant grooves 35 about their circumference and have coolant seals 36 at both ends. A shim plate 37 is attached to the top of the mold to resist most of the nozzle force. The other end of the mold has a cavity to guide and contain the neck ring 38.

The split neck rings 38 are held in a closed relation by springs (not shown). Liquid coolant passages are provided in each neck ring half. The neck ring can float vertically as well as about its center so that it will locate properly in the parison mold. Two rods (not shown) connect the neck ring halves so that when the rods are separated, the neck rings all open simultaneously. Rollers are placed on each end of the bars.

The core rods 39 and core rod stops 40 are mounted on a movable core rod die plate 42 which is the main movable pattern of the parison forming press and applies the force to the mold components.

Figure 6:
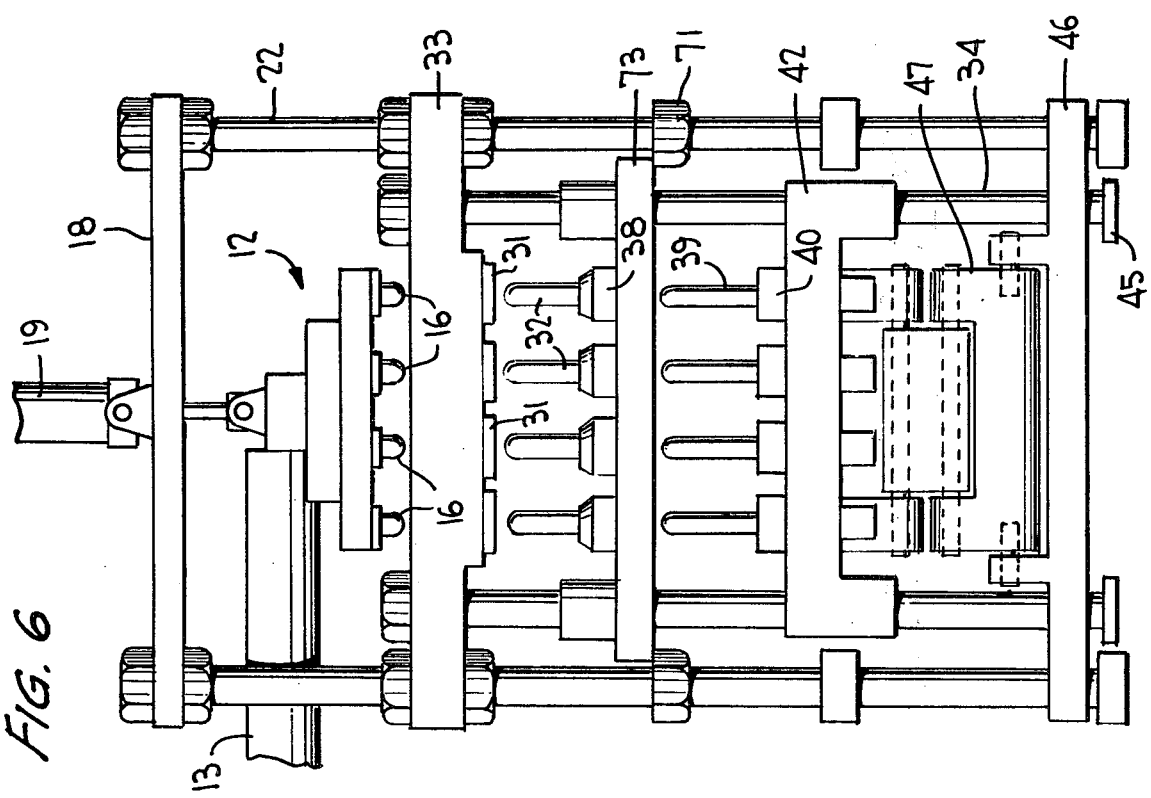
FIG. 6 is a view taken along lines 6—6 of FIG. 4 showing the parison forming section of the machine system with the parison forming press open.

A core rod cylinder 48 is attached to the core rod die plate 42 with the piston rod end connected to the invert mechanism carriage 73. The invert carriage stop nuts 71, as shown in FIG. 6, stop and position the invert carriage on its downward stroke.

The parison toggle assembly 47 is connected to the core rod die plate 42 and the toggle support plate 46. The parison mold tie bars 34 support the toggle support plate which is also guided by the machine support bars 22. Adjustment of the press force is made by the sprocket nuts 45 at the end of tie bars.

Figure 7:
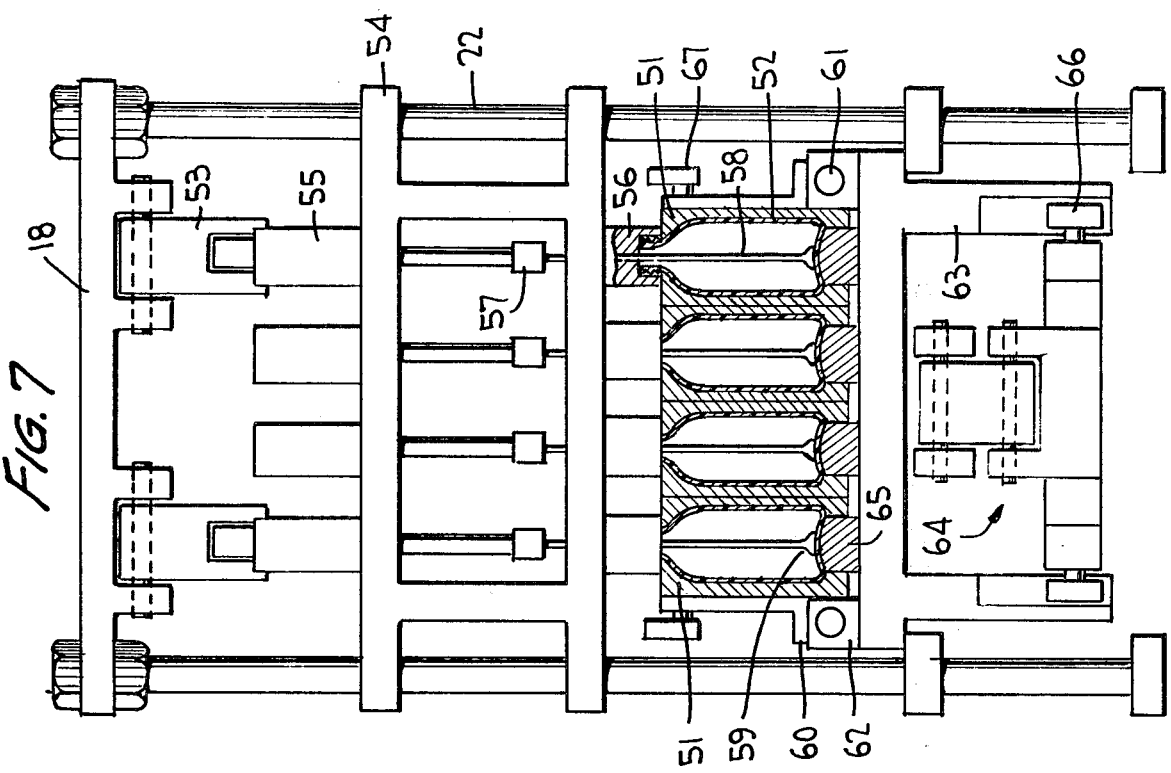
FIG. 7 is a side view along lines 7—7 of FIG. 5 showing the bottle forming section of the machine system with the blow area press assembly closed.

Blow Section (primarily FIGS. 4, 5, and 7)

The blow-stretch toggle 53 is supported at the top of the machine by the support 18. This toggle moves the blow-stretch carriage 54 that carries the stretch rod cylinders 55 and blow head 56. This carriage slides on the machine support bars 22 and is positioned vertically directly above and parallel to the split blow molds 51. Attached to the stretch rod cylinders with connector 57 is the stretch rod 58 and stretch rod foot 59.

The split blow molds 51 of cylindrical design are attached to the blow mold die plate 60. These die plates are supported by the die plate support bars 61 and support mounting block 62. Besides supporting the die plate, the support bars also act to open and close the blow mold. The support mounting blocks 62 are attached to the blow mold frame 63 which in turn rests on a portion of the main frame 21. The mold die plate 60 also acts as a coolant manifold through which coolant enters the bottom of the mold via transfer tubes. This allows for fast and simple mold changes.

Besides supporting the blow die plates, the blow mold frame 63 supports the pivots for the blow toggle assemblies 64 and the stationary mold bottom plates 65. A portion of the mold frame is slotted and acts as a guide for the toggle guide roller 66 which maintains toggle centrality.

Invert Section (primarily FIGS. 4, 5, 3 and 9)

The invert mechanism is mounted on movable invert mechanism carriage 73 with its pivot centerline or axis 79 between the parison molds 31 and blow molds 51. The neck ring assembly is centered around an axis 95 that is laterally spaced from and substantially transverse to the axis 79. The invert arms 74 are mounted on a ball spline shaft 76. The splined shaft is driven by a rack and pinion at one end in order that the invert arm will rotate 180 degrees and return. The invert arm has a cam groove 77 which is positioned by an adjustable roller guide assembly 78 such that as the invert arm rotates it also translates. This is to allow the neck ring to be spread from the close parison mold spacing to the wider blow mold spacing. As seen most clearly in FIG. 9, the axial translations are all different. The outer arms spread substantially in opposite directions towards their respective sides of the machine and the adjacent arms doing the same although with lesser translation. The neck ring assembly 38, after the parisons 40 have been inverted into the blow mold and the blow mold closed, opens and rotates 180 degrees in the opposite direction to the parison forming station.

Bottle Take-Out Section (primarily FIGS. 2–5)

The take-out assembly 80 located on the blow end of the machine maintains vertical bottle orientation during 180 degrees rotation while removing bottles 52 from blow mold 51 and depositing the bottles on conveyor 90.

Jaws or fingers 81 on the corresponding sides of each bottle are on a common shaft and the two shafts are geared together. A crank on one shaft is activated by an air cylinder to grasp and release the bottles.

Mode Of Operation Of Machine System

The parison injection and bottle blowing may be carried on simultaneously and the operation described hereinafter are the steps necessary to make a complete bottle.

The core rod cylinder 48 begins to lift the core rod die plate 33 to raise the core rods 39 through neck ring 38. Simultaneously the core rod toggle assembly 47 begins to close the press, thus lifting the core rod die plate 33 and invert mechanism carriage 73. As the press closes, the toggle pushes the core rod stop 40 against the neck ring 38 which is forced against the tapered mold cavity in which it now rests. As this is happening, the injection unit 10 is brought down until nozzles 16 rest against the parison molds 31, as shown in FIG. 8.

The hot runner valve 15 opens followed by plastic injection into the parison molds to form the parisons 32. After injection screw recovery and decompression, the hot runner valve 15 closes. The injection unit is then lifted a small distance above the mold through pivoting of the injection assembly about 17.

When the parison has been properly temperature conditioned, the press begins to open. As the parison is being pulled from the mold, the core rod cylinder 48 begins pulling the core pin 39 from the parison 32. The net effect is that the core rod die plate 33 and invert mechanism carriage are both being lowered, however, the invert carriage at a slower rate. The core rod die plate 33 goes down until the cylinder bottoms, the invert mechanism die plate bottoms on stop nuts.

As the plates bottom, the core rods will have been stripped from the parisons. The invert arms 70 rotate 180 degrees and spread, carrying the neck ring 38 and parison 32 into the open blow molds 51.

The blow mold 51 closes, the neck ring opening mechanism cams 67 open the neck ring, and the invert arm and neck ring return to the parison position for another cycle.

The blow heads 56 are lowered over the parison and the stretch rod 58 is thrust downward through the neck ring opening stretching the parison and then pinning it to the mold bottom plate with stretch rod foot 59. Pre-blow air may be introduced while stretching. Final blow air is then introduced into the parison, blowing the bottle to the mold configuration (FIGS. 5 and 7). When the bottle has been properly cooled, the blow head and stretch rod are moved vertically out of the bottle causing the bottle pressure to drop to atmospheric.

The take-out mechanism 80 rotates 180 degrees and fingers 81 grab the top of the bottles. The mold then opens ready for the next cycle. The take-out rotates back 180 degrees and the fingers release the bottle onto a conveyor 90.

Although the machine system has been described with reference to a two module system in side-by-side relation with each module comprising four parison mold and blow mold units, numerous other arrangements can be utilized as diagrammatically exemplified by the embodiments of FIGS. 10a through 10e. FIG. 10a illustrates a machine system having a single module utilizing four parison and blow mold units. FIG. 10b illustrates two of the module units of FIG. 10a in back-to-back relation. FIG. 10c illustrates diagrammatically the arrangement above described; whereas FIG. 10d illustrates two sets of four parison molds being alternately blown in a single set of four blow molds. FIG. 10e illustrates back-to-back neck rings on a single invert arm, with each invert arm thereby servicing two parison molds and two blow molds. The arm extending mechanism, and blow mold opening and closing mechanism are shown by arrows. FIG. 10f illustrates an arrangement which permits the close spacing of parisons using five parison and blow mold units in place of four.

The advantages of the presently described machine system and process include the carrying out of the injection or parison molding and blow molding operations simultaneously and as integral steps. The overlapping of the parison forming and blowing cycle maximizes the efficiency of both the parison molds and blow molds. Further, the machine system and process of this invention optimize the use of solid parison molds which provide improved circumferential parison cooling. Since the parison forming operation is independent of the blowing operation, one core rod operates exclusively with one parison mold, thus alignment of the core rod and parison mold can be individually set. The core rod complexity is eliminated since the core rod does not need to have stretch and blow features normally associated with a hot-blow or one-step operation. The system provides for complete temperature control of parison molds, core rods, neck rings, and blow molds, improving process flexibility for optimizing uniformity in productivity and optimizing the structural characteristics of the blown bottles.

Further, since the axis of both parison and blow molds are vertical, more uniform material and thermal distribution are obtained with minimum mold tooling. For each bottle cavity it is necessary to have only one parison mold, one neck ring, one core rod, one blow mold, and one stretch rod. The components are relatively simple, reducing construction costs and ease of installation.

The modular units as defined herein permit the construction of compact systems, reducing the size of the overall machine system while permitting the construction of machine systems having virtually any number of bottle forming units.

As will be apparent to one skilled in the art, various modifications can be made within the hereinbefore described machine system and process with respect to making improved bottles. The preferred embodiments described are not to be construed as a limitation of the invention.

I claim:

1. A machine system for the manufacture of molecularly oriented plastic bottles comprising an injection mold for forming a parison, a blow mold for blowing a parison into a bottle laterally spaced from said injection mold, an invert arm including parison engaging means on the extreme end of said arm for releasably engaging a parison, arm invert means at the end of said arm opposite of said parison-engaging means mounted to rotate about a first axis, said first axis being laterally spaced from and substantially transverse to the axis of said injection mold, said blow mold and said parison engaging means, said invert means at a first position positioning said parison-engaging means over said injection mold and upon inverting said arm 180 degrees to a second position positioning said parison-engaging means over said laterally spaced blow mold.

2. A machine system for the manufacture of molecularly oriented plastic bottles comprising a plurality of parison forming stations for forming parisons in parison molds including a parison neck ring assembly and means for simultaneous injection molding and forming a plurality of parisons in said molds; a plurality of blow mold stations equal to said number of parison forming stations for simultaneously blowing said plurality of parisons, said plurality of parison forming stations laterally spaced from said blow mold stations, and an invert arm assembly constructed and arranged between said parison forming and blowing stations, said invert arm assembly having a plurality of arms equal to said number of parison forming stations each having means on the extreme end thereof for engaging said neck ring of said parison mold, said arm assembly being mounted to rotate about a first axis, the axis of said neck rings and said parison being laterally spaced from and substantially transverse to said first axis, and means for rotating said arms and neck rings from a first position from said parison forming station about said first axis 180 degrees to a second position over the laterally spaced blow mold station and from said second position to said first position.

3. The machine system of claim 2 wherein the number of parison forming stations, blow mold stations, and arms in said plurality is four.

4. The machine system of claim 3 wherein said invert arm assembly includes means which simultaneously with said invert motion causes a translatory motion spreading said arms when rotating from said first position to said second position and which brings said arms together when rotating from said second to first positions.

5. The machine system of claim 4 wherein said plurality of parison forming stations, blow mold stations, and the invert arm assembly are constructed and arranged as a modular unit.

6. A machine system comprising a plurality of said modular units of claim 5.

7. The machine system of claim 6 wherein at least two of said modular units are assembled with the plurality of parison forming stations being back to back.

8. The machine system of claim 7 wherein said parison molds are solid molds.

9. The machine system of claim 8 wherein said blow molds are split molds.

* * * * *